March 31, 1942.　　　J. F. CULLIN　　　2,278,247
PROPELLER
Filed Jan. 15, 1941
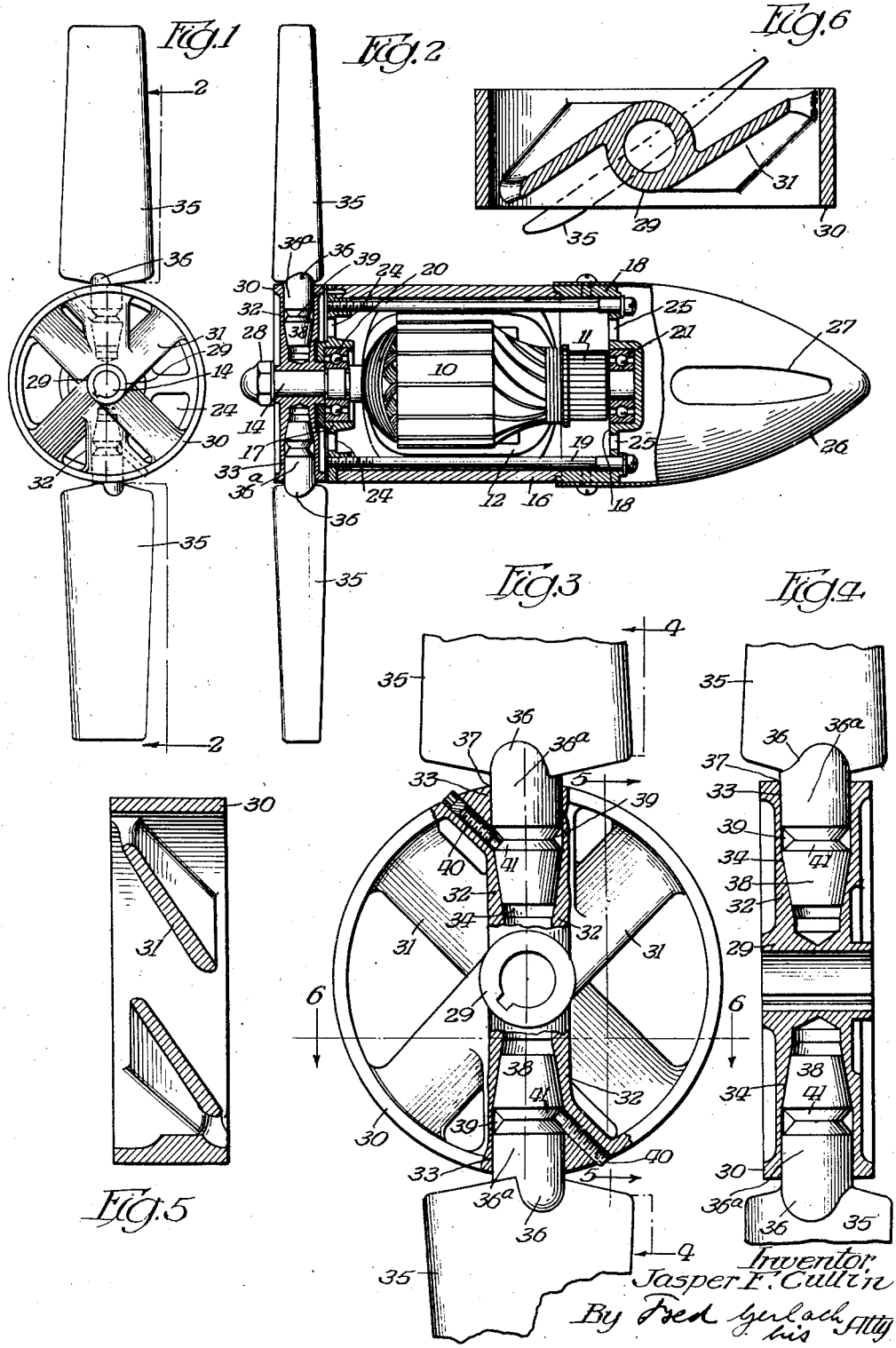
Inventor,
Jasper F. Cullin
By Fred Gerlach his Atty Patented Mar. 31, 1942

2,278,247

UNITED STATES PATENT OFFICE 2,278,247

PROPELLER

Jasper F. Cullin, Detroit, Mich., assignor of two-thirds to Lou Mervis, Lock Haven, Pa.

Application January 15, 1941, Serial No. 374,451

3 Claims. (Cl. 290—55)

The invention relates to wind-driven propellers for electric generators.

One object of the invention is to provide an improved wind-driven propeller in which is incorporated means for cooling the generator operated by the propeller.

Another object of the invention is to provide improved and simple means for adjustably securing the blades in the hub for pitch variation.

Other objects of the invention will appear from the detail description.

The invention consists in the several novel features which are hereinafter set forth and are more particularly defined by claims at the conclusion hereof.

In the drawing: Fig. 1 is a front elevation of a propeller embodying the invention. Fig. 2 is a longitudinal section on line 2—2 of Fig. 1, of the propeller and electric generator. Fig. 3 is a front elevation of the propeller hub, parts being broken away to show the shanks of the blades. Fig. 4 is a section on line 4—4 of Fig. 3. Fig. 5 is a section on line 5—5 of Fig. 3. Fig. 6 is a section on line 6—6 of Fig. 3.

The invention is exemplified as used for driving an electric generator which comprises an armature 10, a commutator 11, fields 12, a shaft 14, on which the armature and commutator are mounted, a casing comprising a cylindrical section 16, heads 17 and 18 at the ends of the cylindrical section 16 and secured thereto by tie-bolts 19. Shaft 14 is journaled in a ball-bearing 20 in head 17 and a ball-bearing 21 in head 18. Heads 17 and 18 are provided with ventilating openings 24 and 25. A tapered shell 26 provided with openings 27 is secured to the head 18. This generator includes brushes and electrical connections, as well understood in the art, for delivering the current generated to the place of consumption. The invention is adapted for use on aircraft, and other applications. The generator casing may be mounted in any suitable manner on the aircraft or other supporting structure, so that the air flow in flight or wind will drive the propeller and the shaft 14.

The propeller comprises a hub secured by a nut 28 on the front end of the propeller shaft which projects from the generator casing and a pair of blades mounted in the hub for pitch variation so that the speed of the propeller may be varied according to the speed of flight or wind velocity. The hub comprises a central member or portion 29 surrounding and keyed to shaft 14; an annular rim 30; and spokes 31 between the central portion 29 and the rim, all of which are integral.

The spokes 31 extend radially between the rim and central portion 29 and are inclined in cross-section relatively to the path of rotation, as illustrated in Fig. 4, to function as vanes adapted to augment the blades in providing power to rotate the shaft 14 for driving the generator. These spokes rotate across the air in front of the openings 24 in head 17 so that the air passing through the hub and between the vanes 31 will be forced rearwardly through openings 24 and through the generator casing for cooling the generator. The rim 30 of the hub extends close to the front of the generator casing and directs the air within it to the openings 24 in the head 17 for cooling the generator.

The hub is also provided with a pair of diametrically opposite blade-retaining members 32 integral with the hub. A radial socket is formed in each member 32 which has a cylindrical outer end 33 and a tapered inner end 34.

The propeller comprises blades 35 of airfoil cross-section, each of which has a shank 36 welded to or integral with the blade. Each shank 36 is provided with an outer cylindrical portion 36ª fitting in the cylindrical portion 33 and an inner end 38 conformably to and fitting in the tapered portion 34 of a socket in the hub. An annular V-shaped groove 39 is formed in the shank 36 and a headless screw 40 which passes through the rim 30 and is threaded to the retaining member 32 of the hub. The axis of the threaded opening in the hub and screw 40 is oblique to the axis of shank 36 and blade, and intersects the shank axis inwardly of the inner conical surface 41 of groove 39. When screw 40 is tightened, its inner end will engage the conical shoulder 41 formed by the groove 39 and jamb the inner tapered end 38 of the shank into the tapered portion 34 of the socket to rigidly secure the blade in the retaining member 33 against rotation and radial outward movement. When the screws 40 are loosened the blades 35 may be rotated in the socket in the retaining member for pitch variation and when the screw is tightened the blade will be securely locked against pitch changes. The cylindrical portions 33 and 36ª prevent angular variation of the axis of the blades by the screws.

In operation, assuming the generator to be mounted on an airplane, the movement of the airplane in flight will cause the blades 35 to rotate and will also act on the vanes 31 in the hub 30 to aid the blades in rotating the shaft 14 of the generator. The air within the rim 30 passing between the vanes 31 of the hub will also be forced backwardly by the vanes to deliver air through the openings 24 into the generator casing from which it will escape through openings 25 and 27 for the purpose of cooling the several parts of the generator. The inner face of the central portion of the propeller blade fits closely to the front face of head 17 and the inner face of the rim 30 fits closely to the front face of the head to direct the air to the area in front of the head 17 for passage through the openings 24. The outer periphery of the rim of the hub 30 corresponds substantially to the periphery of the head 17 and casing section 16 for the same purpose. The pressure of the air against the pressure faces of blades 35, such as is developed in the flight of the airplane, will cause rotation of the blades and will also exert pressure against the outer inclined faces of the vanes 31 disposed within the rim 30 of the hub to assist the blades in rotating the shaft 14 for driving the armature and commutator of the generator. When it is desired to vary the pitch of the blades it is only necessary to loosen the screws 40 sufficiently to permit the blades to be rotated for that purpose and, when the screws are again tightened, the blades will be fixedly held at their assigned pitch.

The invention exemplifies a propeller blade, more particularly adapted for wind-driven generators, in which the hub is formed to force air through the generator casing for cooling or ventilating the generator, and which constitutes a simple and efficient expedient for that purpose. The invention also provides simple means for securing the blades in the hub and permitting rotation of the blades for pitch-variation.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a wind-driven propeller for driving an electric generator which is provided with a casing having openings in one of its ends, the combination of a shaft projecting from said end of the casing, a hub comprising a central member secured on the shaft, a rim, vanes between the rim and said central member, said rim being extended close to said end of the generator casing for directing air through the hub and to said openings, the hub being provided with radial sockets, and variable pitch blades having shanks secured in the sockets.

2. In a wind-driven propeller for driving an electric generator which is provided with a substantially cylindrical casing having openings in one of its ends, the combination of a shaft projecting from said end of the casing, a hub comprising a central member secured on the shaft, a rim, vanes between the rim and said central member, said rim conforming substantially and being extended close to said end of the generator casing for directing air through the hub and to said openings, the hub being provided with radial sockets, and variable pitch blades having shanks sscured in the sockets.

3. In a wind-driven propeller for driving an electric generator which is provided with a casing having openings in one of and supported in its ends, the combination of a shaft projecting from said end of the casing, a hub comprising a central member secured on the shaft, a rim, vanes between and integral with the rim and said central member, said rim being extended close to said end of the generator-casing and positioned for directing air through the hub and to said openings, and blades fixed to the hub and projecting outwardly from the rim for driving the shaft.

JASPER F. CULLIN.